(12) United States Patent
Wu (10) Patent No.: US 12,133,178 B2
(45) Date of Patent: Oct. 29, 2024

(54) POWER CONTROL METHOD, TERMINAL, AND NETWORK-SIDE DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 489 days.

(21) Appl. No.: 17/377,536

(22) Filed: Jul. 16, 2021

(65) Prior Publication Data

US 2021/0345256 A1 Nov. 4, 2021

Related U.S. Application Data

(63) Continuation of application No. PCT/CN2020/070896, filed on Jan. 8, 2020.

(30) Foreign Application Priority Data

Jan. 18, 2019 (CN) .......................... 201910056539.1

(51) Int. Cl.
*H04W 52/28* (2009.01)
*H04W 52/14* (2009.01)

(52) U.S. Cl.
CPC ....... *H04W 52/281* (2013.01); *H04W 52/146* (2013.01)

(58) Field of Classification Search
CPC ... H04W 52/04; H04W 52/146; H04W 52/18; H04W 52/28; H04W 52/281;
(Continued)

(56) References Cited

U.S. PATENT DOCUMENTS 9,055,585 B2 * 6/2015 Lohr ................ H04W 72/0453
9,215,686 B2 * 12/2015 Kazmi ................... H04B 17/27
(Continued)

FOREIGN PATENT DOCUMENTS

CN 102348269 A 2/2012
CN 102932892 A 2/2013
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0 (Sep. 2018), Valbonne, France.
(Continued)

*Primary Examiner* — Quochien B Vuong
(74) *Attorney, Agent, or Firm* — Price Heneveld LLP (57) ABSTRACT

A power control method, a terminal, and a network-side device are provided. The method includes: performing a first power control operation or a second power control operation. The first power control operation includes: reporting power allocation information corresponding to at least one first identification of the terminal. The second power control operation includes: selecting at least one first target identification from at least one second identification of a terminal for uplink signal transmission based on power priorities of uplink transmissions; and/or determining a transmit power corresponding to the at least one second identification based on a maximum power reduction corresponding to the at least one second identification.

17 Claims, 3 Drawing Sheets

Perform a first power control operation or a second power control operation ⟶ 201

(58) Field of Classification Search
CPC ... H04W 52/30; H04W 52/34; H04W 52/365; H04W 52/367; H04W 8/06; H04W 8/18; H04W 8/183; H04W 8/26; H04W 60/005
See application file for complete search history.

(56) References Cited

U.S. PATENT DOCUMENTS

| | | | |
|---|---|---|---|
| 9,775,082 B1* | 9/2017 | Chakraborty | H04W 76/15 |
| 10,136,446 B2* | 11/2018 | Maheshwari | H04W 52/367 |
| 2012/0314640 A1 | 12/2012 | Kim et al. | |
| 2013/0114457 A1 | 5/2013 | Han et al. | |
| 2014/0155119 A1 | 6/2014 | Bishop et al. | |
| 2015/0031408 A1* | 1/2015 | Kalla | H04W 52/367 |
| | | | 455/522 |
| 2015/0085760 A1 | 3/2015 | Yamada et al. | |
| 2015/0373651 A1 | 12/2015 | Ryu et al. | |
| 2020/0022094 A1 | 1/2020 | You et al. | |

FOREIGN PATENT DOCUMENTS

| | | | |
|---|---|---|---|
| CN | 105580451 A | 5/2016 | |
| CN | 106559203 A | 4/2017 | |
| CN | 106686712 A * | 5/2017 | .......... H04W 52/288 |
| CN | 108632891 A | 10/2018 | |
| CN | 109155659 A | 1/2019 | |
| EP | 3340732 A1 | 11/2017 | |
| JP | 2013520917 A | 6/2013 | |
| KR | 20130031883 A | 3/2013 | |
| WO | 2018063200 A1 | 4/2018 | |

OTHER PUBLICATIONS

"3rd Generation Partnership Project; Technical Specification Group Radio Access Network; NR-' Medium Access Control (MAC) protocol specification (Release 15)", 3GPP TS 38.321 V15.4.0 (Dec. 2018), Valbonne, France.

"3rd Generation Partnership Project; Technical Specification Group Radio Access Network; NR-' Physical layer procedures for control (Release 15)", 3GPP TS 38.213 V15.4.0 (Dec. 2018), Valbonne, France.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.4.0 (Dec. 2018), Valbonne, France.

* cited by examiner

FIG. 1

Perform a first power control operation or a second power control operation — 201

FIG. 2

Receive power allocation information corresponding to at least one first identification that is reported by a terminal, where the least one first identification is an identification of the terminal — 301

POWER CONTROL METHOD, TERMINAL, AND NETWORK-SIDE DEVICE

CROSS-REFERENCE TO RELATED APPLICATIONS

This application is a continuation application of PCT International Application No. PCT/CN2020/070896 filed on Jan. 8, 2020, which claims priority to Chinese Patent Application No. 201910056539.1, filed in China on Jan. 18, 2019, both disclosures of which are incorporated herein by reference in their entireties.

TECHNICAL FIELD

Embodiments of this disclosure relate to the field of communications technologies, and in particular, to a power control method, a terminal, and a network-side device.

BACKGROUND

It is widely known that a terminal can now have several subscriber identity module (SIM) cards, and one or more SIM cards can simultaneously have multiple network registrations (hence, a multi-registration terminal). Such a terminal can camp on and/or establish a connection with a plurality of cells at the same time. In addition, the terminal may camp on and/or establish a connection with one cell or different cells, while different cells may have the same or different radio access technologies (for example, cell 1 is a 4G long term evolution (LTE) cell, and cell 2 is a 5G new radio (NR) cell).

When the terminal registers or attaches to a network-side device, the network-side device assigns a terminal identification to the terminal, and the terminal can transmit an uplink signal by using the terminal identification. When the terminal has a plurality of terminal identifications, the terminal can transmit a plurality of uplink signals by using the plurality of terminal identifications. Due to limitation of a total transmit power of the terminal, some uplink signals are unable to be transmitted, resulting in loss of data transmissions.

SUMMARY

Embodiments of this disclosure provide a power control method.

According to a first aspect, an embodiment of this disclosure provides a power control method, where the method includes:
performing a first power control operation or a second power control operation, where
the first power control operation includes: reporting power allocation information corresponding to at least one first identification of a terminal; and
the second power control operation includes: selecting at least one first target identification from at least one second identification of the terminal for uplink signal transmission based on power priorities of uplink transmissions; and/or determining a transmit power corresponding to the at least one second identification based on a maximum power reduction corresponding to the at least one second identification.

According to a second aspect, an embodiment of this disclosure provides a power control method, where the method includes:
receiving power allocation information corresponding to at least one first identification that is reported by a terminal, where the at least one first identification is an identification of the terminal.

According to a third aspect, an embodiment of this disclosure further provides a terminal, where the terminal includes:
a power control module, configured to perform a first power control operation or a second power control operation, where
the first power control operation includes: reporting power allocation information corresponding to at least one first identification of the terminal; and
the second power control operation includes: selecting at least one first target identification from at least one second identification of the terminal for uplink signal transmission based on power priorities of uplink transmissions; and/or determining a transmit power corresponding to the at least one second identification based on a maximum power reduction corresponding to the at least one second identification.

According to a fourth aspect, an embodiment of this disclosure further provides a network-side device, where the network-side device includes:
a receiving module, configured to receive power allocation information corresponding to at least one first identification that is reported by a terminal, where the at least one first identification is an identification of the terminal.

According to a fifth aspect, an embodiment of this disclosure further provides a terminal, where the terminal includes a processor, a memory, and a program stored in the memory and capable of running on the processor, and when the program is executed by the processor, the steps of the power control method according to the first aspect are implemented.

According to a sixth aspect, an embodiment of this disclosure further provides a network-side device, where the network-side device includes a processor, a memory, and a program stored in the memory and capable of running on the processor, and when the program is executed by the processor, the steps of the power control method according to the second aspect are implemented.

According to a seventh aspect, an embodiment of this disclosure further provides a computer-readable storage medium, where the computer-readable storage medium stores a program, and when the program is executed by a processor, the steps of the power control method according to the first aspect or the second aspect are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains based on the embodiments of this disclosure shall fall within the protection scope of this disclosure.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C. Similarly, the use of "at least one of A and B" in the specification and claims should be understood as "A alone, B alone, or both A and B".

Figure 1:
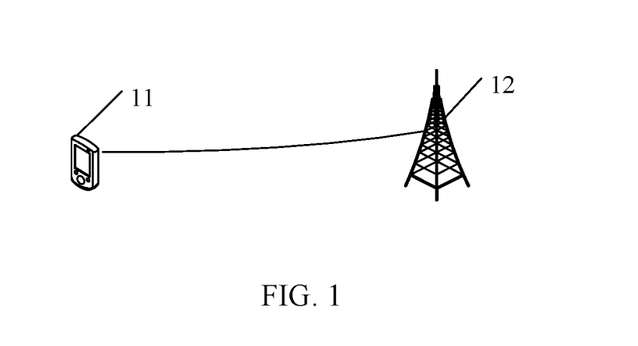
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network-side device 12, and communication can be performed between the terminal 11 and the network-side device 12.

In this embodiment of this disclosure, the terminal 11 may also be referred to as UE (User Equipment). In actual implementation, the terminal 11 may be a terminal-side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in the embodiments of this disclosure.

The network-side device 12 may be a base station, a relay, an access point, or the like. The base station may be an LTE base station, a 5G base station, or a base station of a later release (for example, a 5G NR NB), or a base station in another communications system (for example, an eNB (Evolved NodeB)). It should be noted that, a specific type of the network-side device 12 is not limited in the embodiments of this disclosure.

The power control method in the embodiments of this disclosure is mainly applied to a terminal for managing uplink transmit powers of the terminal. The terminal may be a mobile phone, a tablet personal computer, a laptop computer, a personal digital assistant (PDA), a mobile Internet device (MID), a wearable device, or the like.

The following describes the power control method in the embodiments of this disclosure.

Figure 2:
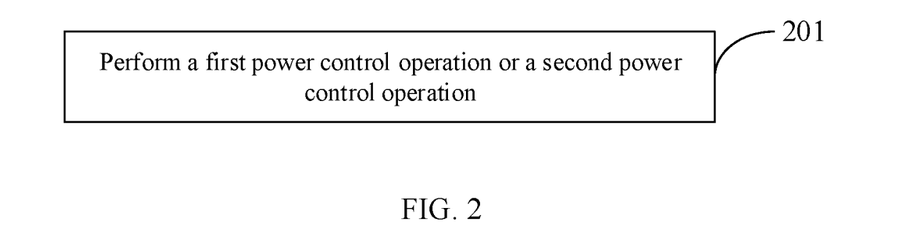
FIG. 2 is a first flowchart of a power control method according to an embodiment of this disclosure.

FIG. 2 is a first flowchart of a power control method according to an embodiment of this disclosure. As shown in FIG. 2, the power control method may include the following step:

Step 201: Perform a first power control operation or a second power control operation.

The first power control operation includes: reporting power allocation information corresponding to at least one first identification of a terminal.

The second power control operation includes: selecting at least one first target identification from at least one second identification of the terminal for uplink signal transmission based on power priorities of uplink transmissions; and/or determining a transmit power corresponding to the at least one second identification based on a maximum power reduction corresponding to the at least one second identification.

In this embodiment, the terminal may include one or more SIM cards, and each SIM card may register or attach to a network-side device one or more times. For each registration or attachment, the network-side device to which the card attempts to register or attach assigns an identification to the terminal. The number of identifications may be configured depending on an actual need, and is not further limited herein.

Specifically, identification information of the identifications assigned by the network-side device to the terminal may include at least one of the following: a SIM number, an international mobile subscriber identity (IMSI), a temporary mobile subscriber identity (TMSI), a system architecture evolution temporary mobile subscription identity S-TMSI (System Architecture Evolution TMSI), a 5G-S-TMSI, and a radio network temporary identity (RNTIF).

Further, different identifications may be in a same connection state or in different connection states. For example, identification 1 is in an idle state, and identification 2 is in a connected state.

It should be noted that each identification may work in one or more cells, and different identifications may work in a same cell or in different cells. This is not further limited herein.

Specifically, in the first power control operation, the terminal reports the power allocation information corresponding to the at least one first identification of the terminal. In this way, the terminal can coordinate power allocation information corresponding to the at least one first identification based on a total transmit power, avoiding that a total transmit power for uplink signal transmissions exceeds the total transmit power of the terminal, thereby effectively avoiding loss of data transmissions due to limitation of the total transmit power of the terminal.

In the second power control operation, the terminal may select the at least one first target identification from the at least one second identification of the terminal based on the power priorities of uplink transmissions for uplink signal transmission; and/or determine the transmit power corresponding to the at least one second identification based on the maximum power reduction corresponding to the at least one second identification, avoiding that a total transmit power for uplink signal transmissions exceeds the total transmit power of the terminal, thereby effectively avoiding loss of data transmissions caused by limitation of the total transmit power of the terminal. In this embodiment, a preset transmit power corresponding to each of the at least one second identification may be prescribed by a protocol or configured by the network-side device, and the preset transmit power may be reduced by a corresponding maximum power reduction to obtain a final transmit power.

In this embodiment of this disclosure, transmit powers corresponding to identifications of the terminal are coordinated through the first power control operation or the second power control operation, avoiding that the total transmit power for uplink signal transmissions exceeds the total transmit power of the terminal, thereby effectively avoiding loss of data transmissions caused by limitation of the total transmit power of the terminal.

Further, in some optional embodiments, when the first power control operation is performed, before the power allocation information corresponding to the at least one first identification of the terminal is reported, the method further includes:

determining power allocation information corresponding to at least one third identification, where the at least one first identification is an identification in the at least one third identification.

The at least one third identification may be part or all of the identifications of the terminal. The reported at least one first identification are part or all of the at least one third identification. In this embodiment, power allocation information corresponding to the identifications of the terminal may be coordinated and determined before part or all of the identification(s) are reported. This avoids determining power allocation information before each reporting, thereby reducing the number of times of determining power allocation information by a system.

The reported power allocation information corresponding to the at least one first identification of the terminal includes:

in a case that the terminal is allowed to report power allocation information corresponding to different identifications, reporting target power allocation information by using a second target identification, where when the second target identification belongs to the at least one first identification, the target power allocation information includes: power allocation information corresponding to the second target identification, and/or power allocation information corresponding to at least one first identification other than the second target identification in all of the at least one first identification; and when the second target identification is an identification of the terminal other than the at least one first identification, the target power allocation information includes power allocation information corresponding to at least one of the at least one first identification.

It should be understood that, in this embodiment, for reporting, by the terminal, the power allocation information corresponding to the at least one first identification, whether the terminal is allowed to report power allocation information corresponding to different identifications may be prescribed by a protocol or configured by the network-side device. Specifically, when this is configured by the network side device, configuration may be performed in any one of the following manners:

Manner 1: The network-side device transmits indication information to the terminal, where the indication information is used to indicate whether the terminal is allowed to report power allocation information corresponding to different identifications.

Manner 2: The network-side device transmits indication information to the terminal, where the indication information is used to indicate a capability of the network-side device of supporting reception of power allocation information corresponding to different identifications reported by a terminal. In this manner, in a case that the network-side device supports reception of power allocation information corresponding to different identifications reported by a terminal, it can be understood that the network-side device allows the terminal to report the power allocation information corresponding to the different identifications.

Further, to reduce electrical energy consumption of the terminal, one piece of power information is allowed to be reported only once within a time period. For example, after transmitting the target power allocation information by using the second target identification, the method further includes:

prohibiting reporting of the target power allocation information within a preset time period.

In this embodiment, a configuration of a prohibit timer (for example, duration of prohibitTimer) may be implemented by the network-side device or prescribed by a protocol. During running of the timer, the terminal is allowed to transmit the target power allocation information by using the second target identification.

Further, the power allocation information includes at least one of the following:

a maximum transmit power available for the at least one first identification (for example, a maximum power available for identification 1 is 10 dBm);

power reduction information corresponding to the at least one first identification (for example, a power reduction corresponding to identification 1 is 10 dBm); and a power headroom available for the at least one first identification (for example, a power headroom that is still available for identification 1 in cell 1 is 10 dBm).

In some optional embodiments, the power allocation information further includes at least one of the following:

identification information of the at least one first identification (for example, identification information corresponding to identification 1 includes a SIM number); and a radio access technology of at least one working cell corresponding to the at least one first identification (for example, identification 1 works with LTE).

In this embodiment, the radio access technology includes any one of the following:

code division multiple access (CDMA);

CDMA2000;

global system for mobile communications radio access network (GSM/EDGE Radio Access Network, GERAN);

evolved UMTS terrestrial radio access network (E-UTRAN);

UMTS terrestrial radio access network (UTRAN) (for example, wideband code division multiple access (WCDMA) or time division-synchronous code division multiple access (TD-SCDMA));

5G new radio (NR); and

Wi-Fi.

Further, in some optional embodiments, a sum of reported maximum transmit powers available for the at least one first identification is less than or equal to a maximum transmit power allowed by the terminal. For example, the reported at least one first identification includes identification 1 (for example, UE-ID-1) and identification 2 (for example, UE-ID-2), where a maximum transmit power available for identification 1 is 10 dBm, a maximum transmit power available for identification 2 is 13 dBm, and a maximum transmit power of the terminal is 23 dBm. The maximum transmit power allowed by the terminal may be prescribed by a protocol or configured by the network-side device, which is not further limited herein.

Further, in some optional embodiments, the maximum transmit power corresponding to the at least one first identification is a sum of maximum transmit powers corresponding to at least one working cell corresponding to the at least one first identification; or the maximum transmit power corresponding to the at least one first identification is maximum transmit powers corresponding to at least one working cell corresponding to the at least one first identification.

Further, in some optional embodiments, the power reduction information corresponding to the at least one first identification is a sum of power reduction information corresponding to at least one working cell corresponding to the at least one first identification; or the power reduction information corresponding to the at least one first identification is power reduction information corresponding to at least one working cell corresponding to the at least one first identification.

Further, in some optional embodiments, the power headroom available for the at least one first identification is a sum of power headrooms available for at least one working cell corresponding to the at least one first identification; or the power headroom available for the at least one first identification is power headrooms available for at least one working cell corresponding to the at least one first identification.

It should be noted that after receiving the power allocation information corresponding to the at least one first identification that is reported by the terminal, the network-side device may transmit the power allocation information corresponding to the at least one first identification to a target node in a mobility procedure.

In an implementation, the network-side device transmits, in a handover procedure of the terminal, the power allocation information corresponding to the at least one first identification to a target network-side device of the handover.

In another implementation, when the terminal changes to a target node, the network-side device transmits the power allocation information corresponding to the at least one first identification to the target node, where the target node is a new or changed-to secondary network-side device for the terminal. Specifically, the network-side device is a primary network-side device (that is, a master node (MN)) or a secondary network-side device (that is, a secondary node (SN)).

Further, in some other embodiments, in performing the second power control operation, the at least one second identification is at least one identification corresponding to uplink signal transmissions at a same transmit occasion, and a sum of preset transmit powers corresponding to the at least one second identification is greater than or equal to a maximum transmit power allowed by the terminal.

In this embodiment, the at least one first target identification may be selected from the at least one second identification of the terminal based on the power priorities of uplink transmissions; and/or the transmit power corresponding to the at least one second identification may be determined based on the maximum power reduction corresponding to the at least one second identification.

In a first implementation, when the second power control operation includes selecting at least one first target identification from at least one second identification for uplink signal transmission based on power priorities of uplink transmissions, no uplink signal transmission is performed for a third target identification at the transmit occasion, where the third target identification is an identification other than the at least one first target identification in the at least one second identification.

In this implementation, when a sum of uplink transmit powers corresponding to a plurality of different identifications of the terminal exceeds a maximum transmit power configured by a network or prescribed by a protocol, based on the power priorities of uplink transmissions, the terminal may transmit uplink signals with higher priorities, without transmitting uplink signals with lower priorities, until the sum of the uplink transmit powers corresponding to the different identifications of the terminal is within the maximum transmit power allowed by the terminal.

The at least one first target identification are the first n identifications of the at least one second identification that are arranged according to a rule for prioritizing uplink signal transmissions, and n is a positive integer. For example, the at least one second identification include identification 1, identification 2, and identification 3; a preset transmit power corresponding to identification 1 is 10 dBm, a preset transmit power corresponding to identification 2 is 10 dBm, and a preset transmit power corresponding to identification 3 is 12 dBm; n is 2; the maximum transmit power allowed by the terminal is 23 dBm; an arrangement in descending order of priority according to the rule for prioritizing uplink signal transmissions is: identification 1, identification 2, and identification 3. In this case, identification 1 and identification 2 may be selected for uplink signal transmission, a total transmit power (that is, 20 dBm) corresponding to identification 1 and identification 2 is less than the maximum transmit power allowed by the terminal (23 dBm), and identification 3 is not used for uplink signal transmission.

It should be noted that the rule for prioritizing uplink signal transmissions can be set depending on an actual need. In some optional embodiments, the rule for prioritizing uplink signal transmissions includes at least one of the following:

Rule 1: in order of priority of the at least one second identification; for example, identification 1 takes priority over identification 2, and identification 2 takes priority over identification 3, and based on Rule 1, uplink transmission signals may be selected in sequence based on an order of priority of the at least one second identification;

Rule 2: in order of priority of radio access technologies supported by the terminal. For example, 5G NR takes priority over LTE, and LTE takes priority over UTRAN;

Rule 3: a first type of uplink transmission taking priority over a second type of uplink transmission, where the first type of uplink transmission is uplink transmissions for initiating establishment of an uplink connection, and the second type of uplink transmission is uplink transmissions other than the first type of uplink transmission in all uplink transmissions;

Rule 4: in order of uplink transmission priority of a primary cell and secondary cell(s);

Rule 5: an uplink control channel transmission taking priority over an uplink data channel transmission; and Rule 6: in order of priority of data.

Specifically, in this embodiment, the rule for prioritizing uplink signal transmissions may be prescribed by a protocol, reported by the terminal to the network-side device, or configured by the network-side device.

In this embodiment, priorities of uplink signal transmissions may be determined according to the rule for prioritizing uplink signal transmissions, and uplink signals with higher priorities are transmitted while uplink signals with lower priorities are not, until the sum of uplink transmit powers corresponding to the identifications of the terminal is within the maximum transmit power allowed by the terminal.

In a second implementation, when the second power control operation includes determining a transmit power corresponding to at least one second identification based on a maximum power reduction corresponding to the at least one second identification, an uplink transmit power reduction configuration is prescribed by a protocol or configured by the network-side device.

In this implementation, the uplink transmit power reduction configuration may include at least one of the following:
    identification information of the at least one second identification; and
    a maximum power reduction corresponding to a radio access technology (for example, a maximum power reduction corresponding to LTE of identification 1 is 10 dBm, and a maximum power reduction corresponding to 5G NR of identification 2 is 20 dBm); and
    a maximum power reduction corresponding to the at least one second identification (for example, a maximum power reduction corresponding to identification 1 is 10 dBm).

Specifically, in this embodiment, an uplink transmit power corresponding to the at least one second identification may be reduced based on an uplink transmit power reduction configuration corresponding to the at least one second identification, until a sum of corresponding uplink transmit powers of different second identifications is within the maximum transmit power allowed by the terminal.

In a third implementation, if the second power control operation includes selecting at least one first target identification from at least one second identification of the terminal for uplink signal transmission based on power priorities of uplink transmissions and determining a transmit power corresponding to the at least one second identification based on a maximum power reduction corresponding to the at least one second identification, a first number of identifications can be first selected based on the power priorities of uplink transmissions, and then power reduction is performed until the uplink transmit power is less than or equal to the maximum transmit power allowed by the terminal when transmissions for the selected at least one first target identification are performed at a transmit power remaining after the reduction.

It should be noted that various optional implementations described in this embodiment of this disclosure may be implemented in combination or may be implemented separately, which is not limited in this embodiment of this disclosure.

To help better understand this disclosure, the following describes in detail three different power control procedures.

In Embodiment 1, a method for reporting power configuration information is employed for power control. Specifically, this method may include the following steps:

Step 1: One UE obtains a plurality of identifications from a network side (for example, the UE registers or attaches to the network side multiple times by using one or more SIM cards to obtain UE(UE-ID-1) and UE(UE-ID-2)).

Identification information of the plurality of identifications may include any combination of one or more of the following:
    a SIM number;
    an IMSI;
    a TMSI;
    an S-TMSI;
    a 5G-S-TMSI; and
    an RNTI.

It should be noted that the plurality of identifications of the UE may be in a same connection state or different connection states (for example, UE(UE-ID-1) is in an idle state, and UE(UE-ID-2) is in a connected state).

Step 2: The network side configures or a protocol prescribes whether the UE is allowed to report power allocation information corresponding to different UE identifications.

Example 1: The network side indicates whether the UE is allowed to report power allocation information corresponding to different UE identifications by using system information (for example, SIBx) or dedicated signaling (for example, an RRCReconfiguration message).

Example 2: The network side indicates network-side capability information by using system information (for example, SIBx) or dedicated signaling (for example, a radio resource control (RRC) reconfiguration message), indicating whether the network side supports reception of power allocation information corresponding to different UE identifications reported by UE. In this case, the UE may send a report only when the network side indicates "a capability of supporting reception of power allocation information corresponding to different UE identifications reported by UE".

Step 3: The UE reports the power allocation information corresponding to different UE identifications to the network side by using at least one identification (for example, the UE reports, by using UE(UE-ID-1), the information to a base station serving UE(UE-ID-1)).

The reported power allocation information is specifically: power allocation information corresponding to the reporting UE identification and/or power allocation information corresponding to other UE identifications.

The power allocation information includes any combination of one or more of the following:
    information about a UE identification (for example, UE(UE-ID-1));
    a maximum transmit power available for the UE identification (for example, a maximum power available for UE(UE-ID-1) is 10 dBm);
    a radio access technology with which the UE identification works (for example, UE(UE-ID-1) works with LTE);
    power reduction information corresponding to the UE identification (for example, a power reduction corresponding to UE(UE-ID-1) is 10 dBm); and
    a power headroom available for the identification (for example, a power headroom that is still available for UE(UE-ID-1) in cell 1 is 10 dBm).

The radio access technology includes any of the following:
    CDMA;
    CDMA2000;
    GERAN;
    E-UTRAN (for example, LTE);
    UTRAN (for example, WCDMA or TDS-CDMA);
    5G NR; and
    Wi-Fi.

Furthermore, a total power available for the different UE identifications in the power allocation information corresponding to different UE identifications that is reported by the UE needs to be less than or equal to the maximum transmit power of the UE (for example, a maximum transmit power available for UE(UE-ID-1) is 10 dBm), and a maximum transmit power available for UE(UE-ID-2) is 13 dBm, a sum of which is equal to the maximum transmit power of the UE, 23 dBm).

Furthermore, the maximum transmit power available for the UE identification may be a total maximum transmit power corresponding to at least one working cell corresponding to the UE identification or maximum transmit powers corresponding to at least one working cell corresponding to the UE identification.

Furthermore, the power reduction information corresponding to the UE identification may be total power reduction information corresponding to at least one working cell corresponding to the UE identification or power reduction information corresponding to at least one working cell corresponding to the UE identification.

Furthermore, a power headroom available for the UE identification may be a total power headroom corresponding to at least one working cell corresponding to the UE identification or power headrooms corresponding to at least one working cell corresponding to the UE identification.

Furthermore, if configuration of a prohibit timer is configured by the network side or prescribed by a protocol, the UE starts the prohibit timer after reporting the information (that is, the target power allocation information), and triggers no more reporting of the information during running of the timer.

Step 4: A network node that receives the information reported by the UE may transmit the information to the target node in a mobility procedure.

Example 1: A gNB 1 transmits the information to a target gNB 2 in a handover procedure.

Example 2: A network node that receives the information reported by the UE is an MN or an SN. In an SN addition or change procedure, the network node that receives the information reported by the UE transmits the information to a target SN.

In Embodiment 2, a rule for prioritizing uplink transmissions is employed for power control. Specifically, this method may include the following steps:

Step 1: One UE obtains a plurality of identifications from a network side (for example, the UE registers or attaches to the network side multiple times by using one or more SIM cards to obtain UE(UE-ID-1) and UE(UE-ID-2)).

Identification information of the plurality of identifications may include any combination of one or more of the following:
 a SIM number;
 an IMSI;
 a TMSI;
 an S-TMSI;
 a 5G-S-TMSI; and
 an RNTI.

It should be noted that the plurality of identifications of the UE may be in a same connection state or different connection states (for example, UE(UE-ID-1) is in an idle state, and UE(UE-ID-2) is in a connected state).

Step 2: According to configuration by a network side or prescription by a protocol, when a sum of uplink transmit powers corresponding to different UE identifications exceeds a maximum uplink transmit power allowed by the UE, the UE selects uplink transmission signals according to a rule for prioritizing uplink transmissions. (For example, the UE transmits uplink signals with higher priorities without transmitting uplink signals with lower priorities, until a sum of uplink transmit powers corresponding to different identifications of the UE is within the maximum transmit power allowed by the UE.)

The rule for prioritizing uplink transmissions includes any combination of one or more of the following:
 uplink transmission signals are selected in sequence based on an order of priority of the UE identifications (for example, UE(UE-ID-1) takes priority over UE(UE-ID-2), and UE(UE-ID-2) takes priority over UE(UE-ID-3));
 uplink transmission signals are selected in sequence according to an order of priority of radio access technologies supported by the UE (for example, 5G NR takes priority over LTE, and LTE takes priority over UTRAN);
 an uplink transmission that initiates establishment of an uplink connection takes priority over another uplink transmission (for example, a random access procedure initiated by UE(UE-ID-1) to establish a connection, and Msg1 and/or Msg3 of the random access procedure takes priority over a data (for example, PUSCH) transmission corresponding to UE(UE-ID-1) in a connected state);
 a transmission over PCell (Primary Cell) takes priority over a transmission over SCell (Secondary Cell) (for example, a transmission over PCell corresponding to UE(UE-ID-1) takes priority over a transmission over SCell corresponding to (UE-ID-2));
 a transmission over PCell takes priority over a transmission over PSCell (Primary Secondary Cell, primary secondary cell) (for example, a transmission over PCell corresponding to UE(UE-ID-1) takes priority over a transmission over PSCell corresponding to (UE-ID-2));
 an uplink data channel may be selected for a transmission of an uplink control channel (for example, a transmission of PUCCH (Physical Uplink Control Channel) corresponding to UE(UE-ID-1) takes priority over a transmission of PUSCH (Physical Uplink Shared Channel) corresponding to UE(UE-ID-2); and
 uplink transmission signals are selected in sequence based on an order of priority of data (for example, a data transmission on logical channel 1 corresponding to UE(UE-ID-1) takes priority over a data transmission on logical channel 2 corresponding to UE(UE-ID-2)).

According to the configuration in step 2, when the sum of uplink transmit powers corresponding to the plurality of different UE identifications exceeds the network-configured or protocol-defined maximum transmit power, the UE transmits uplink signals with higher priorities without transmitting uplink signals with lower priorities based on the order of priority in step 2, until the sum of uplink transmit powers corresponding to the different UE identifications is within the maximum uplink transmit power allowed by the UE.

In Embodiment 3, an uplink transmit power reduction method is employed for power control. Specifically, this method may include the following steps:

Step 1: One UE obtains a plurality of identifications from a network side (for example, the UE registers or attaches to the network side multiple times by using one or more SIM cards to obtain UE(UE-ID-1) and UE(UE-ID-2)).

Identification information of the plurality of identifications may include any combination of one or more of the following:
 a SIM number;
 an IMSI;
 a TMSI;
 an S-TMSI;
 a 5G-S-TMSI; and
 an RNTI.

It should be noted that the plurality of identifications of the UE may be in a same connection state or different connection states (for example, UE(UE-ID-1) is in an idle state, and UE(UE-ID-2) is in a connected state).

Step 2: According to configuration by a network side or prescription by a protocol, when a sum of uplink transmit powers corresponding to different UE identifications exceeds a maximum uplink transmit power allowed by the UE, uplink transmit powers corresponding to the identifications are reduced according to an uplink transmit power reduction configuration for the plurality of different UE identifications. (For example, a power reduction corresponding to UE(UE-ID-1) is 10 dBm, and a power reduction corresponding to UE(UE-ID-2) is 20 dBm.)

According to the configuration in step 2, when the sum of uplink transmit powers corresponding to the plurality of different UE identifications exceeds the network-configured or protocol-defined maximum transmit power, the UE reduces the uplink transmit powers corresponding to the UE identifications based on the uplink transmit power reduction configuration in step 2, until the sum of uplink transmit powers corresponding to the different UE identifications is within the maximum uplink transmit power allowed by the UE.

It should be noted that the rules in Embodiment 3 and Embodiment 2 can be used together. For example, uplink transmissions are performed for 3 identifications of the UE at the same time. Then, the UE may select UE(UE-ID-1) and UE(UE-ID-2) according to the priority rule. If the uplink transmit powers corresponding to UE(UE-ID-1) and UE(UE-ID-2) exceed the maximum uplink transmit power of the UE, the UE can perform power reduction for UE(UE-ID-1) and UE(UE-ID-2), until the sum of the uplink transmit powers corresponding to the different UE identifications is within the maximum uplink transmit power allowed by the UE.

Figure 3:
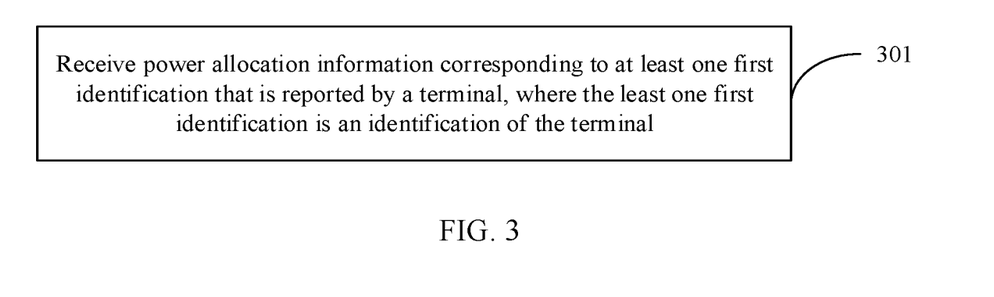
FIG. 3 is a second flowchart of a power control method according to an embodiment of this disclosure.

FIG. 3 is a second flowchart of a power control method according to an embodiment of this disclosure. A main difference between this embodiment and the foregoing embodiment lies in that the network-side device is further limited. Specifics are as follows.

As shown in FIG. 3, the power control method in this embodiment includes the following step:

Step 301: Receive power allocation information corresponding to at least one first identification that is reported by a terminal, where the at least one first identification is an identification of the terminal.

Optionally, the receiving power allocation information corresponding to at least one first identification that is reported by a terminal includes:
  in a case that the terminal is allowed to report power allocation information corresponding to different identifications, receiving target power allocation information reported by the terminal by using a second target identification, where
  when the second target identification belongs to the at least one first identification, the target power allocation information includes: power allocation information corresponding to the second target identification, and/ or power allocation information corresponding to at least one first identification other than the second target identification in all of the at least one first identification; and
  when the second target identification is an identification of the terminal other than the at least one first identification, the target power allocation information includes power allocation information corresponding to at least one of the at least one first identification.

Optionally, the method further includes:
  transmitting configuration information to the terminal, where the configuration information is used to configure that the terminal is prohibited from transmitting the target power allocation information within a preset time period after the terminal transmits the target power allocation information. Optionally, the power allocation information includes at least one of the following:
  a maximum transmit power available for the at least one first identification;
  power reduction information corresponding to the at least one first identification; and
  a power headroom available for the at least one first identification.

Optionally, the power allocation information further includes at least one of the following:
  identification information of the at least one first identification; and
  a radio access technology of at least one working cell corresponding to the at least one first identification.

Optionally, before the receiving power allocation information corresponding to at least one first identification that is reported by a terminal, the method further includes:
  transmitting indication information to the terminal, where the indication information is used to indicate whether the terminal is allowed to report power allocation information corresponding to different identifications; or the indication information is used to indicate a capability of a network-side device of supporting reception of power allocation information corresponding to different identifications reported by a terminal.

Optionally, after the receiving power allocation information corresponding to at least one first identification that is reported by a terminal, the method further includes:
  when the terminal switches from the network-side device to a target network device, transmitting the power allocation information corresponding to the at least one first identification to the target network-side device.

Optionally, after the receiving power allocation information corresponding to at least one first identification that is reported by a terminal, the method further includes:
  when the terminal changes to a target node, transmitting the power allocation information corresponding to the at least one first identification to the target node, where the target node is a new or changed-to secondary network-side device for the terminal.

It should be noted that various optional implementations described in this embodiment of this disclosure may be implemented in combination or may be implemented separately, which is not limited in this embodiment of this disclosure.

It should be noted that for this embodiment is an embodiment of the network-side device corresponding to the embodiment shown in FIG. 2, and specific implementations of this embodiment, reference may be made to the relevant descriptions about the embodiment shown in FIG. 2, and the same beneficial effect is achieved. To avoid repetition, details are not described herein again.

Figure 4:
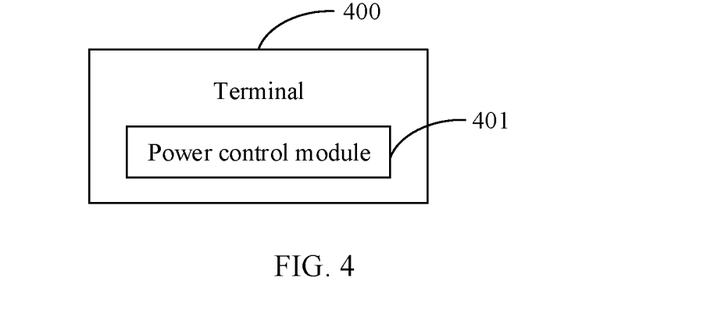
FIG. 4 is a first structural diagram of a terminal according to an embodiment of this disclosure.

FIG. 4 is a first structural diagram of a terminal 400 according to an embodiment of this disclosure. As shown in FIG. 4, the terminal 400 includes:
  a power control module 401, configured to perform a first power control operation or a second power control operation, where the first power control operation includes: reporting power allocation information corresponding to at least one first identification of the terminal; and the second power control operation includes: selecting at least one first target identification from at least one second identification of the terminal for uplink signal transmission based on power priorities of uplink transmissions; or determining a transmit power corresponding to the at least one second identification based on a maximum power reduction corresponding to the at least one second identification.

Optionally, the terminal 400 further includes a determining module, where the determining module is configured to: in a case that the power control module 401 performs the first power control operation, before the reporting power allocation information corresponding to at least one first identification, determine power allocation information corresponding to at least one third identification, where the at least one first identification is an identification in the at least one third identification.

Optionally, the power control module 401 is specifically configured to, in a case that the terminal is allowed to report power allocation information corresponding to different identifications, report target power allocation information by using a second target identification, where when the second target identification belongs to the at least one first identification, the target power allocation information includes: power allocation information corresponding to the second target identification, and/or power allocation information corresponding to at least one first identification other than the second target identification in all of the at least one first identification; and when the second target identification is an identification of the terminal other than the at least one first identification, the target power allocation information includes power allocation information corresponding to at least one of the at least one first identification.

Optionally, the power control module is further configured to, after the target power allocation information is transmitted by using the second target identification, prohibit reporting of the target power allocation information within a preset time period.

Optionally, the power allocation information includes at least one of the following:

a maximum transmit power available for the at least one first identification;

power reduction information corresponding to the at least one first identification; and a power headroom available for the at least one first identification.

Optionally, the power allocation information further includes at least one of the following:

identification information of the at least one first identification; and a radio access technology of at least one working cell corresponding to the at least one first identification.

Optionally, a sum of reported maximum transmit powers available for the at least one first identification is less than or equal to a maximum transmit power allowed by the terminal.

Optionally, the maximum transmit power corresponding to the at least one first identification is a sum of maximum transmit powers corresponding to at least one working cell corresponding to the at least one first identification; or the maximum transmit power corresponding to the at least one first identification is maximum transmit powers corresponding to at least one working cell corresponding to the at least one first identification.

Optionally, the power reduction information corresponding to the at least one first identification is a sum of power reduction information corresponding to at least one working cell corresponding to the at least one first identification; or the power reduction information corresponding to the at least one first identification is power reduction information corresponding to at least one working cell corresponding to the at least one first identification.

Optionally, the power headroom available for the at least one first identification is a sum of power headrooms available for at least one working cell corresponding to the at least one first identification; or the power headroom available for the at least one first identification is power headrooms available for at least one working cell corresponding to the at least one first identification.

Optionally, in performing the second power control operation, the at least one second identification is at least one identification corresponding to uplink signal transmissions at a same transmit occasion, and a sum of preset transmit powers corresponding to the at least one second identification is greater than or equal to a maximum transmit power allowed by the terminal.

Optionally, when the second power control operation includes selecting at least one first target identification from at least one second identification for uplink signal transmission based on power priorities of uplink transmissions, no uplink signal transmission is performed for a third target identification at the transmit occasion, where the third target identification is an identification other than the at least one first target identification in the at least one second identification.

Optionally, the at least one first target identification are the first n identifications of the at least one second identification that are arranged according to a rule for prioritizing uplink signal transmissions, and n is a positive integer.

Optionally, the rule for prioritizing uplink signal transmissions includes at least one of the following:

in order of priority of the at least one second identification;

in order of priority of radio access technologies supported by the terminal;

a first type of uplink transmission taking priority over a second type of uplink transmission, where the first type of uplink transmission is uplink transmissions for initiating establishment of an uplink connection, and the second type of uplink transmission is uplink transmissions other than the first type of uplink transmission in all uplink transmissions;

in order of uplink transmission priority of a primary cell and secondary cell(s);

an uplink control channel transmission taking priority over an uplink data channel transmission; and in order of priority of data.

Optionally, the rule for prioritizing uplink signal transmissions is prescribed by a protocol or configured by a network-side device.

Optionally, when the second power control operation includes determining a transmit power corresponding to at least one second identification based on a maximum power reduction corresponding to the at least one second identification, an uplink transmit power reduction configuration is prescribed by a protocol or configured by a network-side device.

Optionally, the uplink transmit power reduction configuration includes at least one of the following:
- identification information of the at least one second identification; and
- a maximum power reduction corresponding to a radio access technology; and
- a maximum power reduction corresponding to the at least one second identification.

Optionally, identification information of identifications of the terminal includes at least one of the following: a SIM number, an international mobile subscription identity IMSI, a temporary mobile subscription identity TMSI, and a system architecture evolution temporary mobile subscription identity S-TMSI, a 5G-S-TMSI, and a radio access network temporary identifier RNTI.

Optionally, different identifications of the terminals are in a same connection state or in different connection states.

The terminal provided by this embodiment of this disclosure can implement the processes implemented by the terminal in the method embodiment in FIG. 2. To avoid repetition, details are not described herein again.

Figure 5:
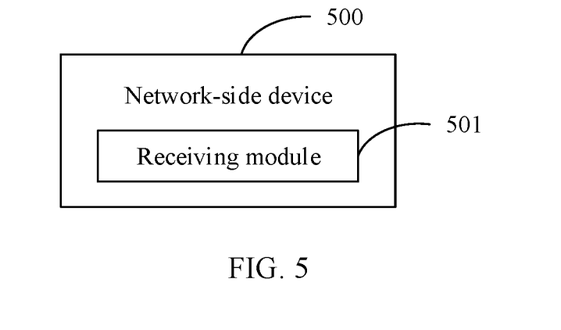
FIG. 5 is a first structural diagram of a network-side device according to an embodiment of this disclosure.

FIG. 5 is a first structural diagram of a network-side device 500 according to an embodiment of this disclosure. As shown in FIG. 5, the network-side device 500 includes:
- a receiving module 501, configured to receive power allocation information corresponding to at least one first identification that is reported by a terminal, where the at least one first identification is an identification of the terminal.

Optionally, the receiving module 501 is specifically configured to, in a case that the terminal is allowed to report power allocation information corresponding to different identifications, receive target power allocation information reported by the terminal by using a second target identification, where
- when the second target identification belongs to the at least one first identification, the target power allocation information includes: power allocation information corresponding to the second target identification, and/or power allocation information corresponding to at least one first identification other than the second target identification in all of the at least one first identification; and
- when the second target identification is an identification of the terminal other than the at least one first identification, the target power allocation information includes power allocation information corresponding to at least one of the at least one first identification.

Optionally, the network-side device 500 further includes:
- a first transmitting module, configured to transmit configuration information to the terminal, where the configuration information is used to configure that the terminal is prohibited from transmitting the target power allocation information within a preset time period after the terminal transmits the target power allocation information.

Optionally, the power allocation information includes at least one of the following:
- a maximum transmit power available for the at least one first identification;
- power reduction information corresponding to the at least one first identification; and
- a power headroom available for the at least one first identification.

Optionally, the power allocation information further includes at least one of the following:
- identification information of the at least one first identification; and
- a radio access technology of at least one working cell corresponding to the at least one first identification.

Optionally, the network-side device 500 further includes:
- a second transmitting module, configured to transmit indication information to the terminal, where the indication information is used to indicate whether the terminal is allowed to report power allocation information corresponding to different identifications; or the indication information is used to indicate a capability of the network-side device of supporting reception of power allocation information corresponding to different identifications reported by a terminal.

Optionally, the network-side device 500 further includes:
- a third transmitting module, configured to, when the terminal switches from the network-side device to a target network device, transmit the power allocation information corresponding to the at least one first identification to the target network-side device.

Optionally, the network-side device 500 further includes:
- a fourth transmitting module, configured to, when the terminal changes to a target node, transmit the power allocation information corresponding to the at least one first identification to the target node, where the target node is a new or changed-to secondary network-side device for the terminal.

The network-side device provided in this embodiment of this disclosure can implement the processes implemented by the network-side device in the method embodiment in FIG. 3. Details are not described herein again to avoid repetition.

Figure 6:
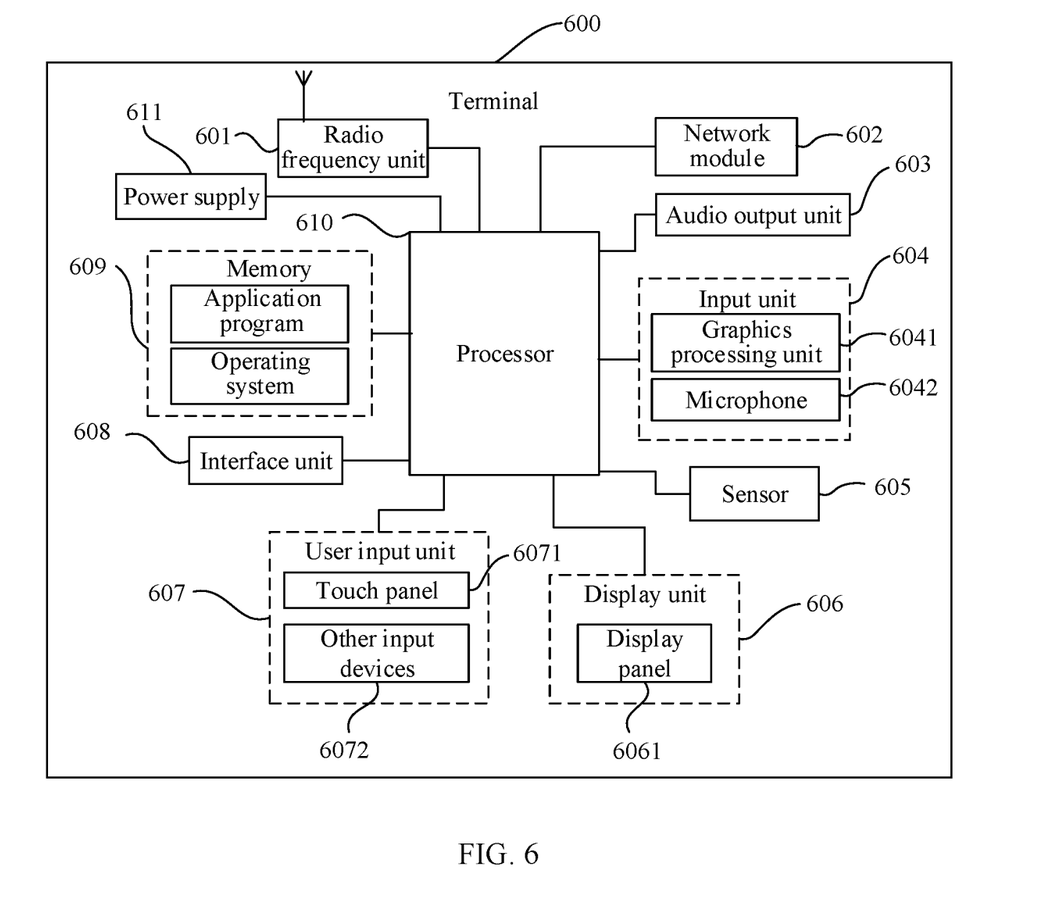
FIG. 6 is a second structural diagram of a terminal according to an embodiment of this disclosure.

FIG. 6 is a second structural diagram of a terminal according to an embodiment of this disclosure. The terminal may be a terminal that implements the embodiments of this disclosure. As shown in FIG. 6, the terminal 600 includes but is not limited to parts such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art may understand that the structure of the terminal shown in FIG. 6 does not constitute a limitation on the terminal. The terminal may include more or fewer components than those shown in the figure, or combine some of the components, or employ a different layout of the components. In this embodiment of this disclosure, the terminal includes but is not limited to a mobile phone, a tablet computer, a notebook computer, a palmtop computer, an in-vehicle terminal, a wearable device, a pedometer, or the like.

The processor 610 is configured to perform a first power control operation or a second power control operation, where
- the first power control operation includes: reporting power allocation information corresponding to at least one first identification of the terminal; and
- the second power control operation includes: selecting at least one first target identification from at least one second identification of the terminal for uplink signal transmission based on power priorities of uplink transmissions; or determining a transmit power corresponding to the at least one second identification based on a maximum power reduction corresponding to the at least one second identification.

Optionally, the processor 610 is further configured to, in performing the first power control operation, before the reporting power allocation information corresponding to at least one first identification, determine power allocation information corresponding to at least one third identification, where the at least one first identification is an identification in the at least one third identification.

Optionally, the processor 610 is specifically configured to, in a case that the terminal is allowed to report power allocation information corresponding to different identifications, report target power allocation information by using a second target identification, where
when the second target identification belongs to the at least one first identification, the target power allocation information includes: power allocation information corresponding to the second target identification, and/or power allocation information corresponding to at least one first identification other than the second target identification in all of the at least one first identification; and
when the second target identification is an identification of the terminal other than the at least one first identification, the target power allocation information includes power allocation information corresponding to at least one of the at least one first identification.

Optionally, the processor 610 is further configured to, after the target power allocation information is transmitted by using the second target identification, prohibit reporting of the target power allocation information within a preset time period.

Optionally, the power allocation information includes at least one of the following:
a maximum transmit power available for the at least one first identification;
power reduction information corresponding to the at least one first identification; and
a power headroom available for the at least one first identification.

Optionally, the power allocation information further includes at least one of the following:
identification information of the at least one first identification; and
a radio access technology of at least one working cell corresponding to the at least one first identification.

Optionally, a sum of reported maximum transmit powers available for the at least one first identification is less than or equal to a maximum transmit power allowed by the terminal.

Optionally, the maximum transmit power corresponding to the at least one first identification is a sum of maximum transmit powers corresponding to at least one working cell corresponding to the at least one first identification; or
the maximum transmit power corresponding to the at least one first identification is maximum transmit powers corresponding to at least one working cell corresponding to the at least one first identification.

Optionally, the power reduction information corresponding to the at least one first identification is a sum of power reduction information corresponding to at least one working cell corresponding to the at least one first identification; or
the power reduction information corresponding to the at least one first identification is power reduction information corresponding to at least one working cell corresponding to the at least one first identification.

Optionally, the power headroom available for the at least one first identification is a sum of power headrooms available for at least one working cell corresponding to the at least one first identification; or
the power headroom available for the at least one first identification is power headrooms available for at least one working cell corresponding to the at least one first identification.

Optionally, in performing the second power control operation, the at least one second identification is at least one identification corresponding to uplink signal transmissions at a same transmit occasion, and a sum of preset transmit powers corresponding to the at least one second identification is greater than or equal to a maximum transmit power allowed by the terminal.

Optionally, when the second power control operation includes selecting at least one first target identification from at least one second identification for uplink signal transmission based on power priorities of uplink transmissions, no uplink signal transmission is performed for a third target identification at the transmit occasion, where the third target identification is an identification other than the at least one first target identification in the at least one second identification.

Optionally, the at least one first target identification are the first n identifications of the at least one second identification that are arranged according to a rule for prioritizing uplink signal transmissions, and n is a positive integer.

Optionally, the rule for prioritizing uplink signal transmissions includes at least one of the following:
in order of priority of the at least one second identification;
in order of priority of radio access technologies supported by the terminal;
a first type of uplink transmission taking priority over a second type of uplink transmission, where the first type of uplink transmission is uplink transmissions for initiating establishment of an uplink connection, and the second type of uplink transmission is uplink transmissions other than the first type of uplink transmission in all uplink transmissions;
in order of uplink transmission priority of a primary cell and secondary cell(s);
an uplink control channel transmission taking priority over an uplink data channel transmission; and
in order of priority of data.

Optionally, the rule for prioritizing uplink signal transmissions is prescribed by a protocol or configured by a network-side device.

Optionally, when the second power control operation includes determining a transmit power corresponding to at least one second identification based on a maximum power reduction corresponding to the at least one second identification, an uplink transmit power reduction configuration is prescribed by a protocol or configured by a network-side device.

Optionally, the uplink transmit power reduction configuration includes at least one of the following:
identification information of the at least one second identification; and
a maximum power reduction corresponding to a radio access technology; and
a maximum power reduction corresponding to the at least one second identification.

Optionally, identification information of identifications of the terminal includes at least one of the following: a SIM number, an international mobile subscription identity IMSI, a temporary mobile subscription identity TMSI, and a system architecture evolution temporary mobile subscription identity S-TMSI, a 5G-S-TMSI, and a radio access network temporary identifier RNTI.

Optionally, different identifications of the terminals are in a same connection state or in different connection states.

It should be noted that the foregoing terminal 600 in this embodiment is capable of implementing the processes of the method embodiments in the embodiments of this disclosure, with the same beneficial effects achieved. To avoid repetition, details are not described herein again.

It should be understood that, in this embodiment of this disclosure, the radio frequency unit 601 may be configured to send or receive a signal in an information transmitting/receiving or call process. Specifically, the radio frequency unit 601 receives downlink data from a base station and sends the downlink data to the processor 610 for processing; and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and other devices via a wireless communications system.

The terminal provides the user with wireless broadband Internet access by using the network module 602, for example, helps the user send or receive an email, browse a web page, access streaming media, and the like.

The audio output unit 603 may convert audio data received by the radio frequency unit 601 or the network module 602 or stored in the memory 609 into an audio signal and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 is capable of receiving sounds and processing such sounds into audio data. The processed audio data can be converted into a format output that can be transmitted to a mobile communication base station by using the radio frequency unit 601 in a telephone call mode.

The terminal 600 further includes at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a motion sensor, an accelerometer sensor may detect magnitudes of accelerations in various directions (typically three axes), may detect the magnitude and direction of gravity when the terminal is still, and may be configured for recognition of terminal postures (for example, landscape/portrait switching, related gaming, or magnetometer posture calibration), and for functions related to vibration recognition (for example, pedometer and tapping), and the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided to the user. The display unit 606 may include the display panel 6061. Optionally, the display panel 6061 may be configured in a form of a liquid crystal display (LCD), an organic light-emitting diode (OLED), or the like.

The user input unit 607 may be configured to receive input digit or character information, and generate key signal input related to user settings and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 610, and receives and executes a command transmitted by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function key (for example, a volume control key or a power on/off key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 for determining a type of the touch event. Then, the processor 610 provides a corresponding visual output on the display panel 6061 based on the type of the touch event. In FIG. 6, the touch panel 6071 and the display panel 6061 serve as two separate components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store software programs and various data. The memory 609 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 609 may include a high-speed random access memory, and may further include a non-volatile memory such as a disk storage device, a flash memory device, or other volatile solid-state storage devices.

The processor 610 is a control center of the terminal, and is connected to all components of the terminal by using various interfaces and lines. By running or executing software programs and/or modules that are stored in the memory 609 and calling data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may alternatively be not integrated in the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein.

Optionally, an embodiment of this disclosure further provides a terminal, including a processor 610, a memory 609, and a program that is stored in the memory 609 and capable of running on the processor 610, where when the program is executed by the processor 610, the processes of the foregoing power control method embodiments are implemented, with the same technical effects. To avoid repetition, details are not further described herein.

Figure 7:
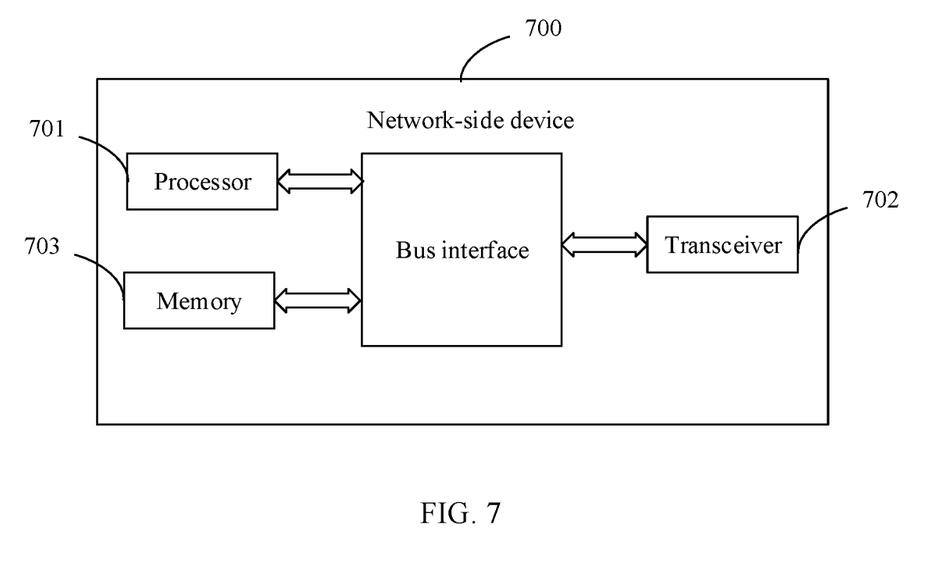
FIG. 7 is a second structural diagram of a network-side device according to an embodiment of this disclosure.

FIG. 7 is a structural diagram of another network-side device according to an embodiment of this disclosure. As shown in FIG. 7, the network-side device 700 includes a processor 701, a transceiver 702, a memory 703, and a bus interface.

The transceiver 702 is configured to receive power allocation information corresponding to at least one first identification that is reported by a terminal, where the at least one first identification is an identification of the terminal.

Optionally, the transceiver 702 is specifically configured to, in a case that the terminal is allowed to report power allocation information corresponding to different identifications, receive target power allocation information reported by the terminal by using a second target identification, where
when the second target identification belongs to the at least one first identification, the target power allocation information includes: power allocation information corresponding to the second target identification, and/ or power allocation information corresponding to at least one first identification other than the second target identification in all of the at least one first identification; and
when the second target identification is an identification of the terminal other than the at least one first identification, the target power allocation information includes power allocation information corresponding to at least one of the at least one first identification.

Optionally, the transceiver 702 is further configured to, transmit configuration information to the terminal, where the configuration information is used to configure that the terminal is prohibited from transmitting the target power allocation information within a preset time period after the terminal transmits the target power allocation information.

Optionally, the power allocation information includes at least one of the following:
a maximum transmit power available for the at least one first identification;
power reduction information corresponding to the at least one first identification; and
a power headroom available for the at least one first identification.

Optionally, the power allocation information further includes at least one of the following:
identification information of the at least one first identification; and
a radio access technology of at least one working cell corresponding to the at least one first identification.

Optionally, the transceiver 702 is further configured to, transmit indication information to the terminal, where the indication information is used to indicate whether the terminal is allowed to report power allocation information corresponding to different identifications; or the indication information is used to indicate a capability of the network-side device of supporting reception of power allocation information corresponding to different identifications reported by a terminal.

Optionally, the transceiver 702 is further configured to, when the terminal switches from the network-side device to a target network device, transmit the power allocation information corresponding to the at least one first identification to the target network-side device.

Optionally, the transceiver 702 is further configured to, when the terminal changes to a target node, transmit the power allocation information corresponding to the at least one first identification to the target node, where the target node is a new or changed-to secondary network-side device for the terminal.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all common sense in the art, and therefore are not further described in this specification. The bus interface provides interfaces. The transceiver 702 may be a plurality of components, including a transmitter and a receiver, and provides units for communicating with a variety of other apparatuses on a transmission medium. For different user equipment, the user interface may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data for use by the processor 701 when the processor 701 performs an operation.

Optionally, an embodiment of this disclosure further provides a network-side device, including a processor 701, a memory 703, and a program stored in the memory 703 and capable of running on the processor 701. When the program is executed by the processor 701, the processes of the foregoing embodiments of the power control method are implemented, with the same technical effects achieved. To avoid repetition, details are not described herein again.

An embodiment of this disclosure further provides a computer-readable storage medium. The computer-readable storage medium stores a program. When the program is executed by a processor, the processes in the foregoing embodiments of the power control method are implemented, and a same technical effect can be achieved. To avoid repetition, details are not described herein again. For example, the computer-readable storage medium is a read-only memory (ROM), a random access memory (RAM), a magnetic disk, an optical disc, or the like.

It should be noted that the terms "comprise", "include", or any of their variants in this specification are intended to cover a non-exclusive inclusion, so that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A power control method, comprising:
performing, by a terminal, a first power control operation or a second power control operation, wherein
the first power control operation comprises: reporting power allocation information corresponding to at least one first identification of the terminal; and
the second power control operation comprises: selecting at least one first target identification from at least one second identification of the terminal for uplink signal transmission based on power priorities of uplink transmissions;
wherein the power allocation information comprises at least one of the following:
a maximum transmit power available for the at least one first identification; or
power reduction information corresponding to the at least one first identification;
wherein the power allocation information further comprises at least one of the following:
identification information of the at least one first identification; or
a radio access technology of at least one working cell corresponding to the at least one first identification;
wherein the reporting, by the terminal, power allocation information corresponding to at least one first identification comprises:
in a case that the terminal is allowed to report power allocation information corresponding to different identifications, reporting, by the terminal, target power allocation information by using a second target identification,
wherein after the reporting, by the terminal, target power allocation information by using a second target identification, the method further comprises:
prohibiting, by the terminal, reporting of the target power allocation information within a preset time period.

2. The method according to claim 1, wherein in performing, by the terminal, the first power control operation, before the reporting power allocation information corresponding to at least one first identification, the method further comprises:
determining, by the terminal, power allocation information corresponding to at least one third identification, wherein the at least one first identification is part or all identification in the at least one third identification.

3. The method according to claim 1, wherein
when the second target identification belongs to the at least one first identification, the target power allocation information comprises at least one of the following: power allocation information corresponding to the second target identification, or power allocation information corresponding to at least one first identification other than the second target identification in all of the at least one first identification; and
when the second target identification is an identification of the terminal other than the at least one first identification, the target power allocation information comprises power allocation information corresponding to at least one of the at least one first identification.

4. The method according to claim 1, wherein a sum of reported maximum transmit powers available for the at least one first identification is less than or equal to a maximum transmit power allowed by the terminal.

5. The method according to claim 1, wherein the maximum transmit power corresponding to the at least one first identification is a sum of maximum transmit powers corresponding to at least one working cell corresponding to the at least one first identification; or
the maximum transmit power corresponding to the at least one first identification is maximum transmit powers corresponding to at least one working cell corresponding to the at least one first identification.

6. The method according to claim 1, wherein the power reduction information corresponding to the at least one first identification is a sum of power reduction information corresponding to at least one working cell corresponding to the at least one first identification; or
the power reduction information corresponding to the at least one first identification is power reduction information corresponding to at least one working cell corresponding to the at least one first identification.

7. The method according to claim 1, wherein the power headroom available for the at least one first identification is a sum of power headrooms available for at least one working cell corresponding to the at least one first identification; or the power headroom available for the at least one first identification is power headrooms available for at least one working cell corresponding to the at least one first identification.

8. The method according to claim 1, wherein in performing, by the terminal, the second power control operation, the at least one second identification is at least one identification corresponding to uplink signal transmissions at a same transmit occasion, and a sum of preset transmit powers corresponding to the at least one second identification is greater than or equal to a maximum transmit power allowed by the terminal.

9. The method according to claim 8, wherein when the second power control operation comprises selecting at least one first target identification from at least one second identification for uplink signal transmission based on power priorities of uplink transmissions, performing, by the terminal, no uplink signal transmission for a third target identification, wherein the third target identification is an identification other than the at least one first target identification in the at least one second identification.

10. The method according to claim 8, wherein the at least one first target identification are the first n identifications of the at least one second identification that are arranged according to a rule for prioritizing uplink signal transmissions, and n is a positive integer.

11. The method according to claim 10, wherein the rule for prioritizing uplink signal transmissions comprises at least one of the following:

in order of priority of the at least one second identification;

in order of priority of radio access technologies supported by the terminal;

a first type of uplink transmission taking priority over a second type of uplink transmission, wherein the first type of uplink transmission is uplink transmissions for initiating establishment of an uplink connection, and the second type of uplink transmission is uplink transmissions other than the first type of uplink transmission in all uplink transmissions;

in order of uplink transmission priority of a primary cell and secondary cell(s);

an uplink control channel transmission taking priority over an uplink data channel transmission; or in order of priority of data.

12. The method according to claim 11, wherein the rule for prioritizing uplink signal transmissions is defined by a protocol or configured by a network-side device.

13. The method according to claim 8, wherein when the second power control operation comprises determining a transmit power corresponding to the at least one second identification based on a maximum power reduction corresponding to the at least one second identification, an uplink transmit power reduction scheme is prescribed by a protocol or configured by a network-side device.

14. The method according to claim 13, wherein the uplink transmit power reduction configuration comprises at least one of the following:

a maximum power reduction corresponding to a radio access technology; or a maximum power reduction corresponding to the at least one second identification.

15. The method according to claim 1, wherein identification information of identifications of the terminal comprises at least one of the following: a SIM number, an international mobile subscription identity IMSI, a temporary mobile subscription identity TMSI, a system architecture evolution temporary mobile subscription identity S-TMSI, a 5G-S-TMSI, or a radio access network temporary identifier RNTI.

16. A terminal, comprising a memory, a processor, and a program stored in the memory and capable of running on the processor, wherein when the program is executed by the processor, the processor is configured to perform a first power control operation or a second power control operation, wherein the first power control operation comprises: reporting power allocation information corresponding to at least one first identification of the terminal; and the second power control operation comprises: selecting at least one first target identification from at least one second identification of the terminal for uplink signal transmission based on power priorities of uplink transmissions;

wherein the power allocation information comprises at least one of the following:

a maximum transmit power available for the at least one first identification; or power reduction information corresponding to the at least one first identification;

wherein the power allocation information further comprises at least one of the following:

identification information of the at least one first identification; or a radio access technology of at least one working cell corresponding to the at least one first identification;

wherein the reporting, by the terminal, power allocation information corresponding to at least one first identification comprises:

in a case that the terminal is allowed to report power allocation information corresponding to different identifications, reporting, by the terminal, target power allocation information by using a second target identification, wherein after the reporting, by the terminal, target power allocation information by using a second target identification, the method further comprises:

prohibiting, by the terminal, reporting of the target power allocation information within a preset time period.

17. A network-side device, comprising a processor, a memory, and a program stored in the memory and capable of running on the processor, wherein when the program is executed by the processor, the processor is configured to receive power allocation information corresponding to at least one first identification that is reported by a terminal, wherein the at least one first identification is an identification of the terminal wherein the power allocation information comprises at least one of the following:

a maximum transmit power available for the at least one first identification; or power reduction information corresponding to the at least one first identification;

wherein the power allocation information further comprises at least one of the following:

identification information of the at least one first identification; or a radio access technology of at least one working cell corresponding to the at least one first identification;

wherein the receiving the power allocation information corresponding to the at least one first identification that is reported by the terminal comprises:

in a case that the terminal is allowed to report power allocation information corresponding to different identifications, receiving target power allocation information reported by the terminal by using a second target identification, wherein after the receiving target power allocation information reported by the terminal by using the second target identification, the terminal is prohibited reporting of the target power allocation information within a preset time period.

* * * * *